США 012135085B2

United States Patent
Schneider et al.

(10) Patent No.: US 12,135,085 B2
(45) Date of Patent: Nov. 5, 2024

(54) SEAL (71) Applicant: AIRBUS OPERATIONS LIMITED, Bristol (GB)

(72) Inventors: Stephan Olexander Schneider, Bristol (GB); Colin John West, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 99 days.

(21) Appl. No.: 17/876,344

(22) Filed: Jul. 28, 2022

(65) Prior Publication Data

US 2023/0031384 A1  Feb. 2, 2023

(30) Foreign Application Priority Data

Jul. 29, 2021  (GB) ...................... 2110889

(51) Int. Cl.
*F16J 15/06* (2006.01)
*B64D 37/00* (2006.01)
*F16J 15/02* (2006.01)
*B64C 1/14* (2006.01)

(52) U.S. Cl.
CPC .......... *F16J 15/06* (2013.01); *B64D 37/005* (2013.01); *F16J 15/021* (2013.01); *B64C 1/14* (2013.01)

(58) Field of Classification Search
CPC .. F16J 15/06; F16J 15/10; F16J 15/104; F16J 15/021; F16J 15/022; B64D 37/005; B64C 1/14
See application file for complete search history.

(56) References Cited

U.S. PATENT DOCUMENTS

| 4,304,415 A | 12/1981 | Wolf et al. |
| 5,301,958 A | 4/1994 | Covington |
| 5,525,226 A | 6/1996 | Brown et al. |

(Continued)

FOREIGN PATENT DOCUMENTS

| CN | 211 550 520 U | 9/2020 |
| EP | 2 905 516 A1 | 8/2015 |
| WO | 02/093045 | 11/2002 |

OTHER PUBLICATIONS

"Create a Groove Milling Operation" Groove Milling. Retrieved from <http://catiadoc.free.fr/online/pmgug_C2/pmgugbt0113.htm> on Jul. 28, 2022, (3 pages).

(Continued)

*Primary Examiner* — Gilbert Y Lee
(74) *Attorney, Agent, or Firm* — Nixon & Vanderhye P.C.

(57) ABSTRACT

A seal is disclosed having a pair of side walls, a base extending between the side walls, a first concave surface extending inwardly from one of the side walls, a second concave surface extending inwardly from the other side wall, and a convex surface extending between the first concave and second concave surface to form a rounded peak having an apex. The seal has a seal width defined between the seal side walls, and a seal height defined between the apex of the rounded peak and the base. The width is at least twice the height of the seal. The seal is located in a channel recess of a first component opposite a second component to seal between the first component and the second component, the channel recess having a floor and a height defined between the floor and a surface of the first component in which the channel recess is formed.

17 Claims, 7 Drawing Sheets

(56) References Cited

U.S. PATENT DOCUMENTS

| | | | |
|---|---|---|---|
| 6,523,833 B1 | 2/2003 | Ishigaki et al. | |
| 7,309,068 B2 * | 12/2007 | Segawa | H01M 8/0276 |
| | | | 277/596 |
| 7,959,161 B2 * | 6/2011 | Seki | G11B 33/1466 |
| | | | 277/648 |
| 9,334,962 B2 * | 5/2016 | Hayashi | F16J 15/106 |
| 10,072,776 B2 * | 9/2018 | Kocourek | F16L 19/0206 |
| 10,260,632 B2 * | 4/2019 | O'Brien | H01J 49/24 |
| 11,359,722 B2 * | 6/2022 | Maheshwari | F16J 15/062 |
| 2005/0035560 A1 | 2/2005 | Segawa et al. | |
| 2008/0191474 A1 | 8/2008 | Kotz et al. | |
| 2010/0084827 A1 | 4/2010 | Peddle | |
| 2011/0221138 A1 | 9/2011 | Doane | |
| 2012/0313027 A1 | 12/2012 | Welchner et al. | |
| 2021/0013521 A1 | 1/2021 | Steinbach et al. | |

OTHER PUBLICATIONS

"Groove Milling", Groovex, Innovative Grooving Solutions, Retrieved from YouTube via <https://www.youtube.com/watch?v=vrFzHJUXjvk>, Dec. 12, 2011, VargusUSA, (1 page).
Combined Search and Examination Report for GB Application No. 2110889.9, dated Dec. 20, 2021 (7 pages).
Extended European Search Report for Application No. EP22185115.7, 11 pages, dated Nov. 22, 2022.

* cited by examiner

SEAL

CROSS RELATED APPLICATION

This application claims priority to United Kingdom Patent Application GB 2110889.9 filed Jul. 29, 2021, the entire contents of which is hereby incorporated by reference.

FIELD OF THE INVENTION

The present invention relates to a seal for locating in a channel recess, a seal assembly, an aircraft assembly with the seal assembly and a method of replacing a seal in the seal assembly.

BACKGROUND OF THE INVENTION

Rubber seal rings are used to seal removable covers, for example in use in aircraft fuel tanks. In order to contain the rubber seal ring, a groove is machined into the covers. The depth of the groove relative to the thickness and compressibility of the seal ring is important for correct sealing of the space inside of the cover. During the assembly of the aircraft and in-service maintenance operation activities, these covers are frequently removed and reinstalled. The seal ring can be liable to fall out of the seal ring groove in the covers when the cover is opened (hinged rotation and/or inversion), or to rotate and twist within the groove. Therefore, typically seal rings are adhered to the floor of the seal ring groove to prevent the seal ring from falling out or rotating within the groove. However, the bonding agent/adhesive used could be hazardous to the operator (requiring PPE) and requires time to fully cure. Additionally, the additional thickness of the bonding agent is difficult to accurately control, which can result in poor quality seal ring compression, and in areas where the bonding agent is thinner, can provide a possible leak path through the cover.

Over-compression of the seal when the cover is closed affects the longevity and effectiveness of the seal. Seals typically over-compress because they are not seated correctly in the recess due to the dimensional tolerance requirements, or due to external environmental effects, such as thermal or fluid effects which affect the seal. Over-compressed seals are prone to rupture and tearing due to internal stresses and shear forces. Wear or failure of the seal is likely to require immediate attention and can require replacement of the seal before next flight. This can impact aircraft operations.

SUMMARY OF THE INVENTION

A first aspect of the invention provides a seal for locating in a channel recess of a first component opposite a second component to seal between the first component and the second component, the channel recess having a floor and a height defined between the floor and a surface of the first component in which the channel recess is formed, the seal comprising a pair of side walls, a base extending between the side walls, a first concave surface extending inwardly from one of the side walls, a second concave surface extending inwardly from the other side wall, and a convex surface extending between the first concave and second concave surface to form a rounded peak having an apex, wherein the seal has a seal width defined between the seal side walls, and a seal height defined between the apex of the rounded peak and the base, wherein the seal width is at least twice the seal height, and wherein the seal is configured such that when the seal is seated on the floor of the channel recess the apex of the rounded peak projects no more than 25% of the seal height from the surface of the first component in which the channel recess is formed so as to define a maximum compressibility of the seal height when the second component is brought into contact with the surface of the first component.

Keeping the maximum compressibility of the seal height to no more than 25% substantially prevents adverse seal material behaviour in rubber seals that could lead to rupture or plastic deformation of the rubber seal causing a potential leak path.

With this arrangement, the first and second concave surfaces extend to the rounded peak with a gentle slope, i.e. relatively large radius. This reduces the internal stresses of the seal, allowing the seal height to be compressed and the seal cross sectional shape (taken in the width-height plane) to deform in the channel recess without excessive shear forces that could otherwise lead to rupture and failure. This improves the longevity and durability of the seal.

Preferably, the channel is generally U-shaped and has a floor, with a pair of side walls that extend up from the floor. It is to be noted that the orientation of the seal assembly is not important and the seal assembly may be inverted such that the 'floor' of the channel recess is measured away from the surface of the first component in which the channel recess is formed regardless of orientation.

Optionally, the apex of the rounded peak is centrally located between the seal side walls, and the seal has a plane of symmetry which bisects the rounded peak through the apex.

The seal may be symmetrical to allow equal compression and deformation of the seal in response to a force applied through the seal apex towards the base.

Optionally, the maximum compressibility of the seal height is between 9.5% and 15%, preferably, approximately 12.5%.

Optionally, there is a first smooth continuous curved transition between the first concave surface and the convex surface, and a second smooth continuous curved transition between the second concave and the convex surface.

The smooth curved transitions may reduce the steepness of the slope between the first concave surface and the convex surface, and second concave surface and the convex surface. This more evenly distributes the compressive force in the seal and helps prevent shear damage to the seal.

Optionally, the seal has a constant cross-section along its length.

A constant cross-section enables the seal to compress uniformly along its length.

Optionally, the seal is made of elastomeric material, for example, fluorosilicone, acrylonitrile butadiene, polychloroprene rubbers, nitrile, EPDM, Butyl or Chlorinated Butyl rubber.

Optionally, the seal is a continuous loop (e.g. a ring seal), and preferably, the seal is moulded.

Continuous loop means that the seal has no defined beginning or end. Moulding the seal improves the dimensional tolerance of the seal during manufacture.

Optionally, the first concave surface and the second concave surface meet their respective side walls at an approximately 90 degree angle.

Optionally, the base of the seal is substantially flat. This may encourage base stability and reduce spiral winding of the seal. The floor of the recess channel may be substantially flat, at least where the base of the seal contacts the recess channel floor.

Optionally, the first and second recess side wall meets the recess floor to form a radiused corner.

A further aspect of the invention provides a seal assembly for sealing between a first component opposite a second component, comprising a channel recess in a first component, the channel recess having a first recess side wall and a second recess side wall, a floor extending between the first and second recess side walls, and a height defined between the floor and a surface of the first component in which the channel recess is formed, and a seal of any preceding claim seated on the floor of the channel recess such that the apex of the rounded peak projects no more than 25% of the seal height from the surface of the first component so as to define the maximum compressibility of the seal height when the second component is brought into contact with the surface of the first component.

Optionally, there is a first void between the first recess side wall and the first concave surface of the seal, and a second void between the second recess side wall and the second concave surface of the seal.

The seal is able to expand into the first and second voids, for example, due to thermal expansion or fluid swell (e.g. due to contact with fuel or other liquid), while still remaining in contact with the second component.

Optionally, the recess channel further comprises a seal retainer for mechanically retaining the seal in the recess channel.

Mechanically retain means to structurally, rather than chemically, hold the seal within the channel recess.

Optionally, the seal retainer comprises one or more overhanging lip portions extending inwardly from a top of the first and/or second recess sidewalls.

The overhanging lip portions may extend over the floor of the channel recess.

Optionally, the seal retainer has a plurality of first overhanging lip portions extending inwardly from the top of the first recess side wall, and a plurality of second overhanging lip portions extending inwardly from the top of the second recess side wall.

Retaining the seal on both sides ensures that the seal cannot be displaced easily during use.

Optionally, each of the first overhanging lip portions and each of the second overhanging lip portions are provided in an alternating arrangement along the recess.

Staggering the first and second overhanging lip portions may enable the seal to be fitted into the channel recess more easily.

Alternating the overhanging lip portions makes it easier to remove and install the seal by press-fitting the seal into the channel recess.

Optionally, the seal is seated within the recess without adhesive.

With this arrangement, the seal assembly can be assembled quicker as there is no additional cure time of the adhesive. The seal assembly can also be assembled with greater accuracy as it is difficult to apply adhesive evenly throughout the channel recess.

A further aspect of the invention provides an aircraft assembly comprising a cover or door for sealing an aperture comprising: the seal assembly, wherein the cover or door is the first component of the seal assembly, and the aperture is formed in the second component of the seal assembly.

A door or cover means a hinged, sliding, or revolving barrier that is arranged over an aperture. A cover means a lid, a solid object that seals a container or an aperture.

Optionally, the cover or door is a cabin door, landing gear door, or a fuel tank access hatch, and the second component is a fuselage, belly fairing or fuel tank of an aircraft.

A further aspect of the invention provides a seal assembly for sealing between a first component opposite a second component, comprising a channel recess in a first component, the channel recess having a first recess side wall and a second recess side wall, a floor extending between the first and second recess side walls, and a seal comprising a pair of side walls, a base extending between the side walls, a first concave surface extending inwardly from one of the side walls, a second concave surface extending inwardly from the other side wall, and a convex surface extending between the first concave and second concave surface to form a rounded peak having an apex, wherein the seal is seated on the floor of the channel recess, and wherein the channel recess further comprises a seal retainer for mechanically retaining the seal in the channel recess.

A further aspect of the invention provides a method of replacing a seal in the seal assembly, the method comprising: removing the seal from the recess, providing a replacement seal, seating the seal on the floor of the channel recess.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
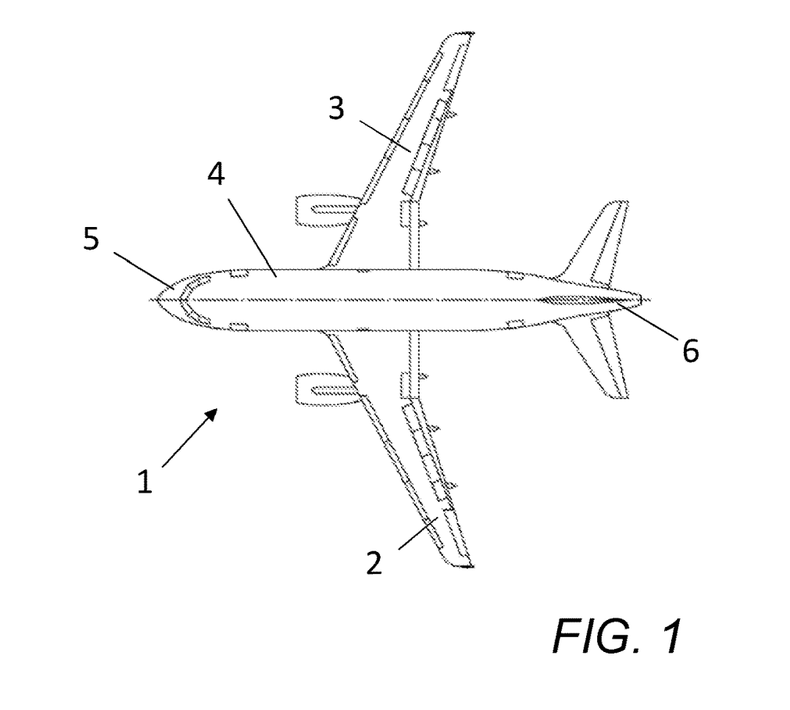
FIG. 1 shows a plan view of an aircraft.

FIG. 1 shows an aircraft 1 with port wing 2, starboard wing 3, fuselage 4, a nose end 5 and a tail end 6. The aircraft 1 is a typical jet passenger transonic transport aircraft but the invention is applicable to a wide variety of fixed wing aircraft types, including commercial, military, passenger, cargo, jet, propeller, general aviation etc.

Figure 2:
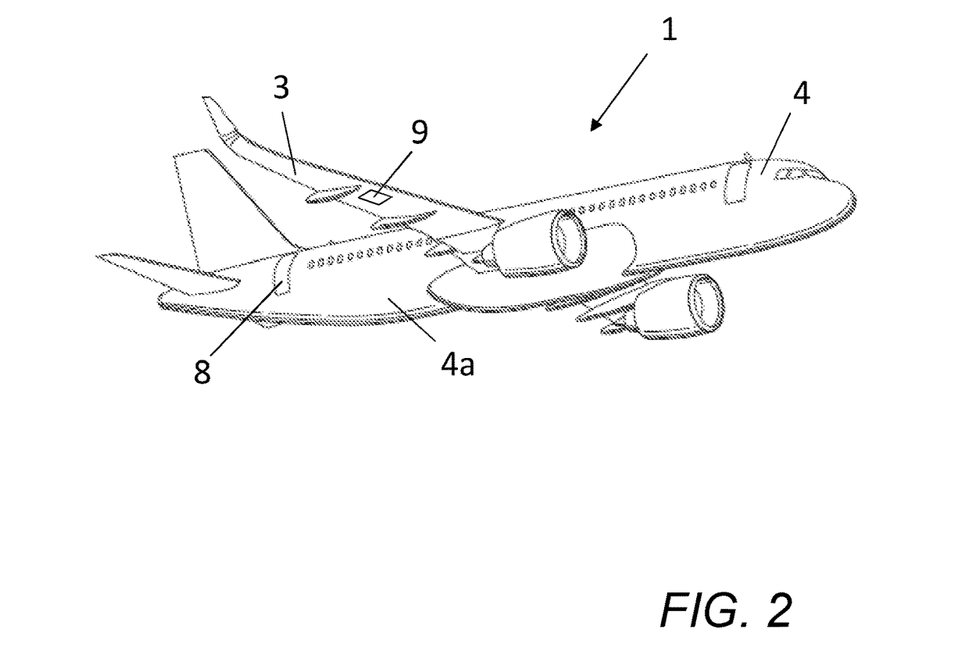
FIG. 2 shows an isometric view of an aircraft.

FIG. 2 shows an oblique isometric view of the aircraft 1 from below. The aircraft 1 has a plurality of seal removable covers, which are arranged over apertures that provide access into the aircraft. For example, cabin doors 8 provide access into the fuselage 4 via passenger exits, fuel tank access hatches 9 provide access to fuel tanks within each wing, 2,3 (not shown), and landing gear doors (not shown) provide access into the belly fairing 4a of the aircraft 1. During flight, the cabin doors 8 and landing gear doors are closed to provide an airtight seal between the fuselage 4 and outside the aircraft 1. Similarly, the fuel tank access hatch 9 provides a fluid-tight seal between the fuel tank and outside the aircraft 1.

Figure 3:
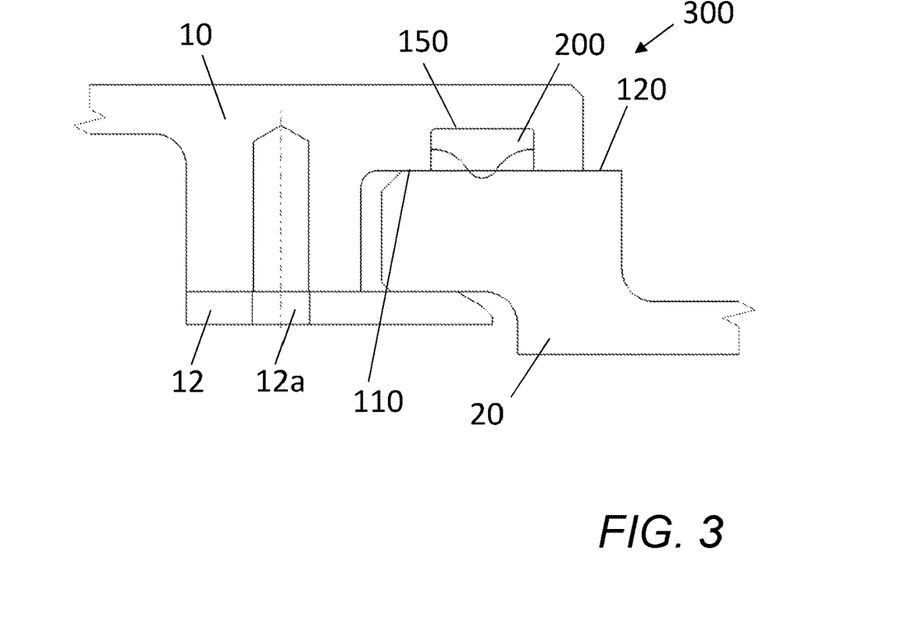
FIG. 3 shows a schematic cross-sectional view of the seal assembly installed.

FIG. 3 schematically illustrates a portion of first component 10 and a portion of second component 20. When assembled, the first component 10 has a first surface 110 which contacts a second surface 120 of the second component 20. In this example, the first component 10 is secured to the second component 20 through a third aircraft component 12 and fastener 12a. A seal 200 (shown in an un-deformed state) is located in a channel recess 150 of the first component to form a seal assembly 300. The seal 200 is opposite the second component 20 and acts to seal between the first and second component 10, 20. The seal 200 is seated in the channel recess 150 such that it can abut against the second component 20 and compress, providing a seal between the first and second components 10, 20.

In this example, the first component 10 is comprised in a fuel access hatch and the second component 20 is comprised in a fuel tank outer wall. The seal 200 is used to seal the gap between the fuel access hatch and the fuel tank outer wall and helps provide a fuel-tight sealing arrangement when the access hatch is fully installed. The seal 200 may be an elastomeric seal that compresses under load.

Figure 4:
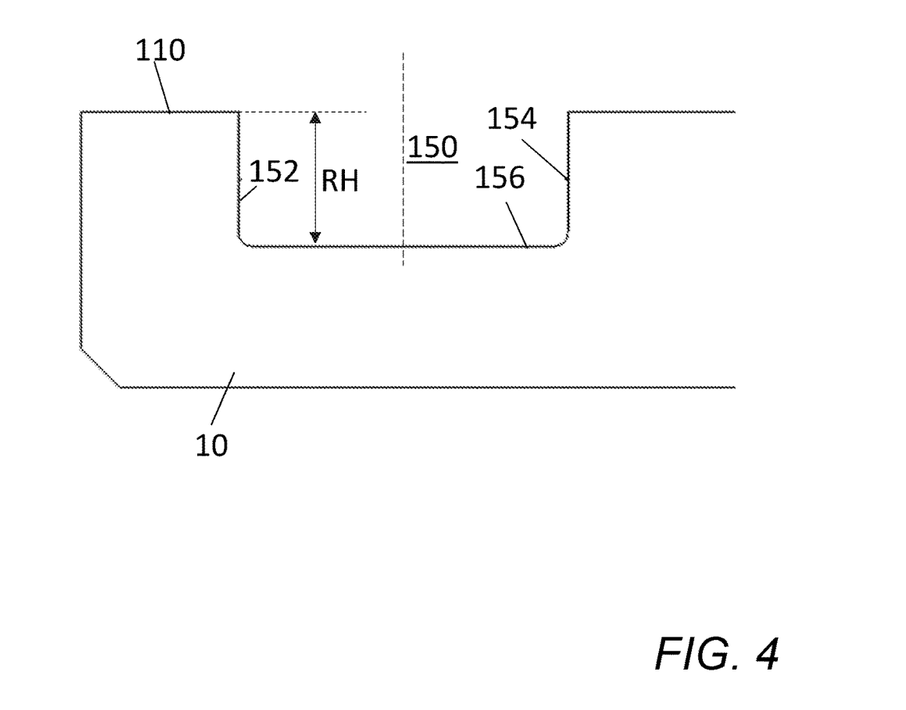
FIG. 4 shows a cross-sectional view of the channel recess.

FIG. 4 shows the channel recess 150 in the first component 10 in greater detail. The channel recess 150 has a floor 156 and a height RH defined between the floor 156 and a first surface 110 of the first component 10 in which the channel recess is formed. The recess 150 has two side walls 152 and 154 which may be parallel to each other and perpendicular to the floor 156 of the recess 150. The first and second recess side walls 152, 154 meet the recess floor 156 to form a radiused corner. The radiused corner helps reduce the stress concentration of the recess 150 within the first component 10.

Figure 5:
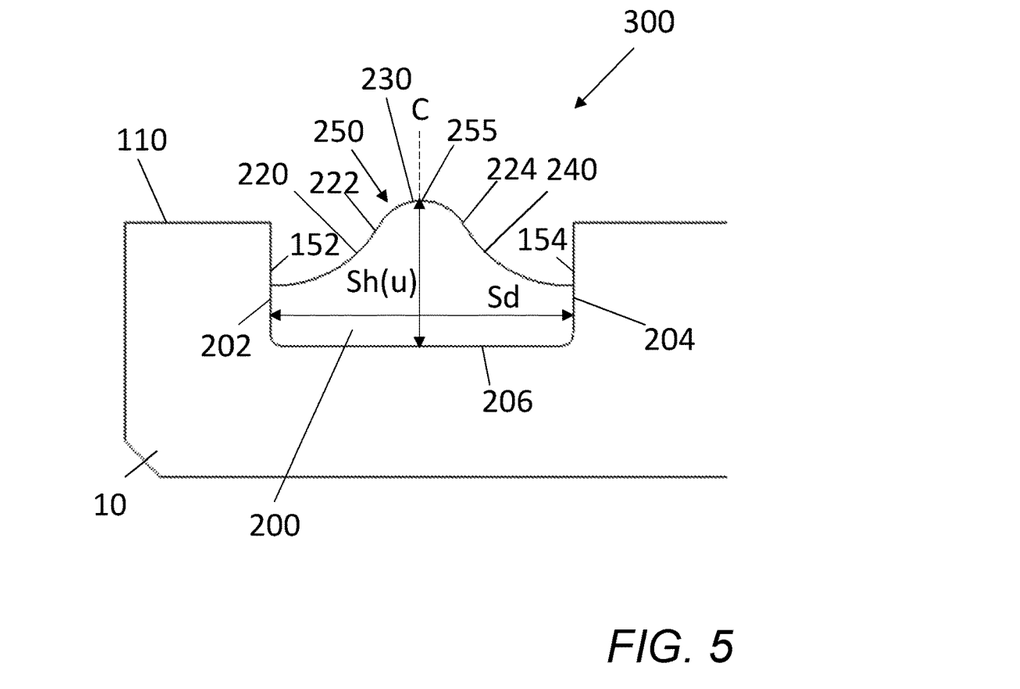
FIG. 5 shows a detailed cross-sectional view of the seal.

FIG. 5 shows the seal 200 in greater detail. The seal 200 may be a monolithic seal which is preferably made of any suitable elastomeric material, such as rubber, fluorosilicone, acrylonitrile butadiene, polychloroprene, nitrile, EPDM, Butyl or Chlorinated Butyl rubber, for example.

The seal 200 may be a ring seal formed as a continuous loop, i.e. it has no defined end and start point. The seal 200 can be manufactured in any suitable way, but preferably is moulded to ensure accurate dimensions of the seal to improve dimensional tolerances of the seal 200 when located in the channel recess 150. Moulding the seal 200 also eliminates excess material being wasted in the manufacture of the seal 200. The seal 200 may have a constant cross section to ensure good sealing contact between the seal 200 and the second component 20 along its length.

The seal assembly 300 comprises the seal 200 located in the channel recess 150. The seal 200 has a pair of side walls 202 and 204 and a base 206 extending between the side walls. The base 206 may be flat. The flat base 206 may encourage base stability and reduce spiral winding. The pair of side walls 202 and 204 may be parallel to each other and extend perpendicularly from the base 206. The seal 200 has a first concave surface 220 extending inwardly, e.g. towards the centreline C, from one of the side walls 202. The seal 200 has a second concave surface 240 extending inwardly, e.g. towards the centreline C, from the other side wall 204, and a convex surface 230 extending between the first concave and second concave surface 220, 240 to form a rounded peak 250 having an apex 255.

The first concave surface 220 and the second concave surface 240 may meet their respective side walls 202, 204 at an approximately 90 degree angle. The seal width, Sd, is defined between the two side walls 202 and 204. The height of the seal is defined Sh is defined between the apex 255 of the rounded peak 250 and the base 206. The seal 200 has a width Sd that is at least twice the height of the seal Sh. The seal 200 also has a length (shown more clearly in FIG. 11).

Between the first concave surface 220 and the convex surface 230, there may be a first smooth continuous curved transition 222. Similarly, the seal 200 may have a second smooth continuous curved transition 224 between the second concave surface 240 and the convex surface 230. The first and second smooth continuous curved transitions 222, 224 provide the location of the steepest slope between the first and second side walls 202, 204 of the seal and the rounded peak 250. It is desirable to minimise the slope in this steepest slope portion at the curved transition to avoid shearing of the seal material. These first and second smooth continuous curved transitions 222, 224 distribute the stress of the seal 200 when under compression over a larger area. This improves the longevity of the seal as the seal is capable of withstanding larger compressive forces and loads without rupturing due to shear forces. As the width of the seal Sd is at least twice the height of the seal Sh, the curvature of the first and second smooth continuous curved transitions 222, 224 has a larger distance to transition between the first and second concave surfaces 220, 240 and the convex surface.

The apex 255 of the rounded peak 250 may be at the centre of the seal 200. That is to say, the apex 255 may be centrally located between the first and second side walls 202, 204. The seal 200 therefore has a plane of symmetry about the centre line C, which bisects the rounded peak 250 through the apex 255. The seal 200 may have a constant cross-section along its length. By having one central apex 255, the seal 200 can deform and compress uniformly across the length of the seal. This evenly distributes the stress of the seal during compression and improves the longevity and durability of the seal by minimising the damage and probability of rupture due to over-compression.

The seal has a seal height defined in a height direction between the apex 255 of the rounded peak and the base 206, and a seal width defined in a width direction between the side walls. FIG. 5 shows the seal in a substantially uncompressed state in the height direction, so the seal height shown in FIG. 5 is an uncompressed seal height designated Sh(u). Optionally the seal may also be in a substantially uncompressed state in the width direction, so the seal width Sd shown in FIG. 5 is an uncompressed seal width.

As shown in FIG. 5, when the base of the seal 206 is seated in the floor 156 of the recess 150, the apex 255 of the rounded peak 250 projects no more than 25% of the uncompressed seal height Sh(u) from the first surface 110 of the first component 10. This projection of no more than 25% of the uncompressed seal height Sh(u) defines the maximum compressibility of the seal height Sh when the second component 20 is brought into contact with the surface of the first component by distance Sc1 (shown in FIG. 6A). This limits the compressibility of the seal 200 while maximising the contact of the apex 155 with the second component 20. This, in combination with the uncompressed seal width Sd being twice the uncompressed seal height Sh(u), provides a seal that is less prone to rupturing due to over-compression.

Figure 6A:
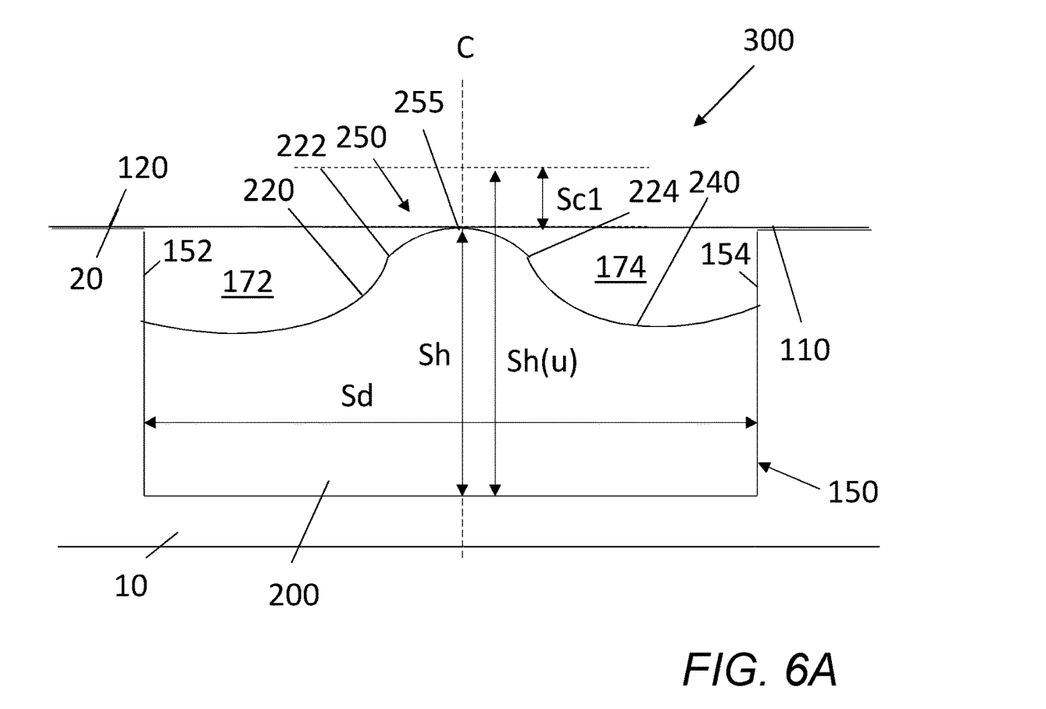
FIG. 6A-6D schematically show the compression of the seal.

FIG. 6A shows the seal 200 of seal assembly 300 in a compressed state, so the seal height has reduced from the uncompressed seal height Sh(u) to a compressed seal height Sh. To seal the first and second components 10, 20, the seal 200 is located in the recess 150. The first surface 110 of the first component 10 is then brought into contact with the second surface 120 of the second component 20. The apex 255 of the rounded peak 250 abuts the second surface 120 and compresses. As the rounded peak 250 projects no more than 25% of the uncompressed seal height Sh(u) in FIG. 5, this defines the maximum compressibility of the seal height when the second component 20 is brought into contact with the first surface 110 of the first component 10.

Figure 6B:
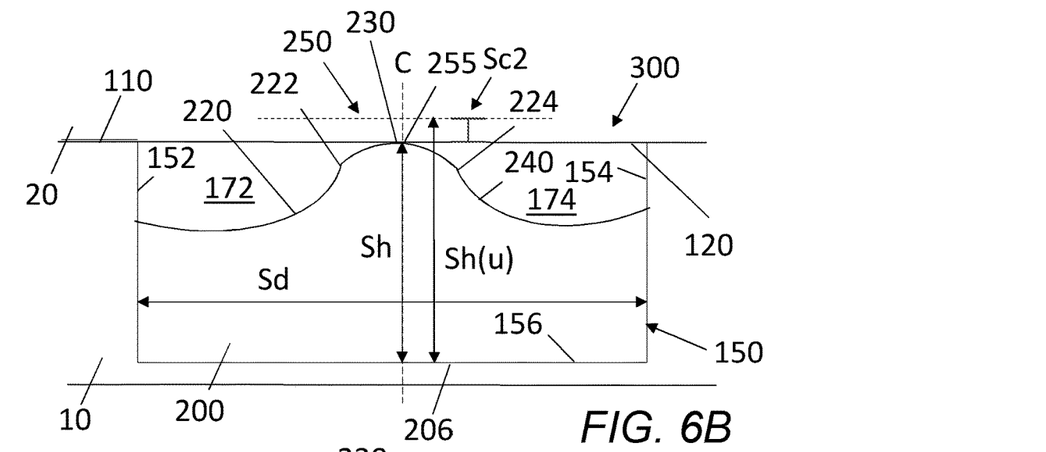
Figure 6C:
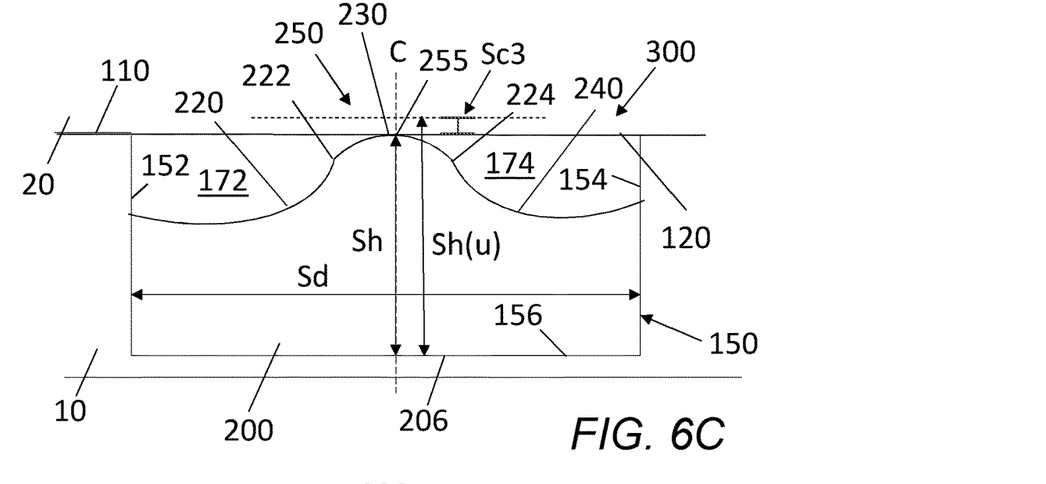
Figure 6D:
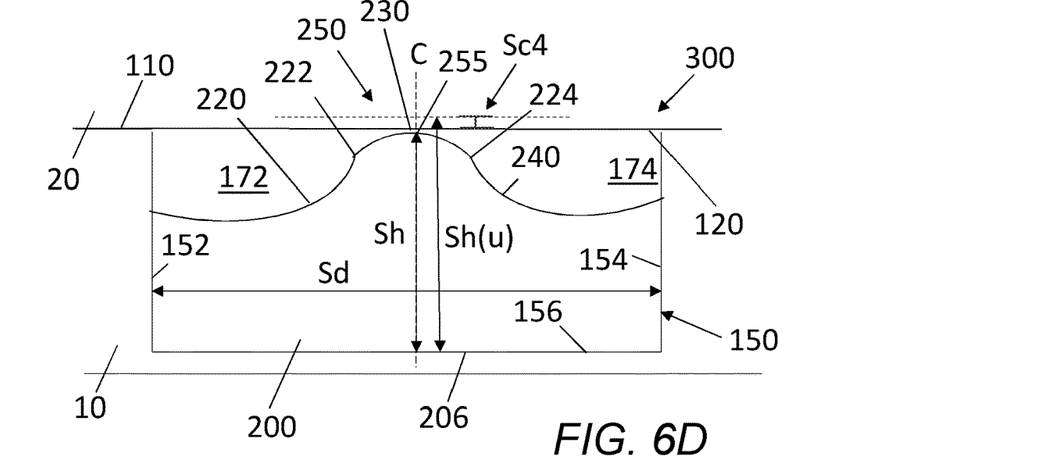

The rounded peak 250 of the seal can project less than 25% of the uncompressed seal height Sh(u) to define the maximum compressibility of the seal height. For example, FIG. 6B schematically shows an example where the maximum compressibility of the seal height is 15% of the uncompressed seal height Sh(u) (indicated by distance Sc2). In this case, the maximum compressibility of the seal height is defined as Sc2/Sh(u). Similarly, FIG. 6C schematically shows another example where the maximum compressibility of the seal height is 12.5% (indicated by distance Sc3). In this case, the maximum compressibility of the seal height is defined as Sc3/Sh(u). Finally, 6D schematically shows another example where the maximum compressibility of the seal height is 9.5% (indicated by distance Sc4). In this case, the maximum compressibility of the seal height is defined as Sc4/Sh(u). Preferably, the maximum compression of the seal height is below 25% to prevent over-compression. However, it will be understood that the maximum compression of the seal height can range from 1%-25%.

As shown in FIG. 5 and FIGS. 6A-D, when the seal 200 is located in the recess 150 to form seal assembly 300, there is a is a first void 172 between the first recess side wall 152 and the first concave surface of the seal 220, and a second void 174 between the second recess side wall 154 and the second concave surface of the seal 240. The first and second voids 172, 174 are present when the seal 200 is in an undeformed state and when the seal 200 is compressed. The first and second voids 172, 174 allow the seal 200 to expand and deform in response to environmental changes without compromising the integrity of the seal 200. For example, under elevated temperatures, the seal 200 may expand in response to thermal stress. The seal 200 can expand into the first and second voids 172, 174 without expanding outside the recess 150. This minimises the damage to the seal 200, but also enables the apex 255 to remain in contact with the second surface of the second component 120 without affecting the sealing assembly 300.

This is particularly advantageous when the seal 200 is used to seal between a first component 10 and a second component 20 in a liquid environment, such as a fuel tank. The seal 200 material may naturally absorb liquid and swell (i.e. get larger) in response. This is especially disadvantageous, as when exposed to fuel, or a mixture of fuel (e.g. kerosene) and water (commonly found in aircraft fuel tanks), the swelling of the seal can result in a seal that is up to three times larger than the original seal 200. The first and second voids 172, 174 allow the seal 200 to expand to accommodate for this swelling without rupturing. Furthermore, during flight, when the seal 200 is exposed to higher altitudes, water and/or fuel and/or a mixture thereof absorbed by the seal may freeze causing the seal to be further deformed or displaced from the recess 150. By ensuring that the seal 200 can expand in the first and second void 172, 174, it minimises possible damage to the seal 200, thereby increasing longevity of the seal. The first and second void 172, 174 also therefore improve the performance of the seal 200, as the seal can maintain contact with the second component 20 during expansion.

For use in sealing an aircraft fuel tank access hatch (for Kerosene based aviation fuels) the seal material may comprise a fluorosilicone rubber, for example. Fluorosilicone rubbers may have good high and low temperature performance with a continuous service temperature range of −55 to +175 degrees C. and an intermittent service temperature range of −65 to +200 degrees C., making them suitable for aircraft service temperatures. They may also have a hardness range of between 31 and 85 IRHD.

Alternative seal materials for the seal in an aircraft fuel tank hatch may include acrylonitrile butadiene, and nitrile/high-nitrile materials, and polychloroprene rubbers.

For sealing hatches of hydrogen fuel tanks for aircraft, EPDM, Butyl or Chlorinated Butyl material may be used, for example.

The seal 200 is located in the channel recess 150 when the base of the seal 206 is seated on the floor of the channel recess 156. In one example, the seal 200 may be secured in the channel recess 150 by using any suitable adhesive along the base of either the seal 206 or on the floor 156 of the channel recess. For example, a vinyl adhesive may be used.

Referring to FIGS. 7-11, in one example, the channel recess 150 may alternatively comprise a seal retainer 400 for mechanically retaining the seal 200 in the channel recess without adhesive. The seal retainer 400 contacts the seal 200 to locate and retain the seal 200 in the channel recess 150.

Figure 7:
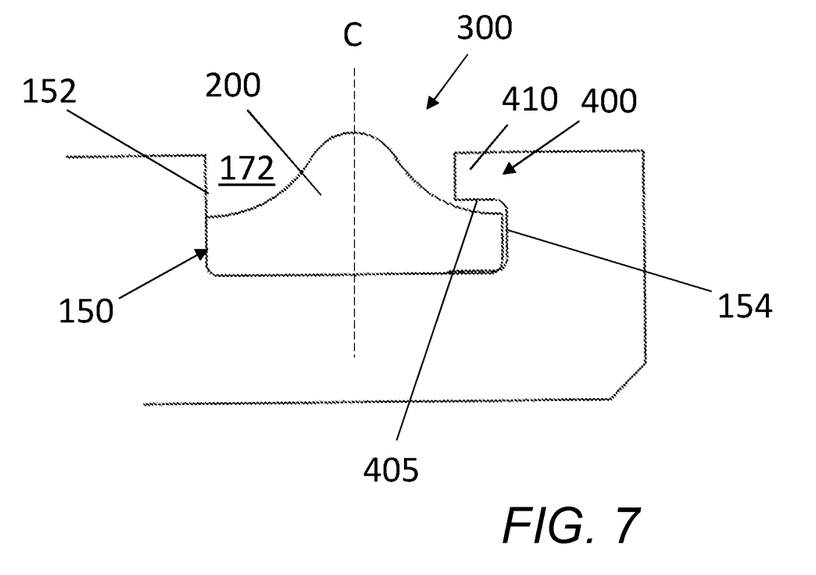
FIG. 7 shows a detailed cross-sectional view of the seal according to another example.
Figure 8:
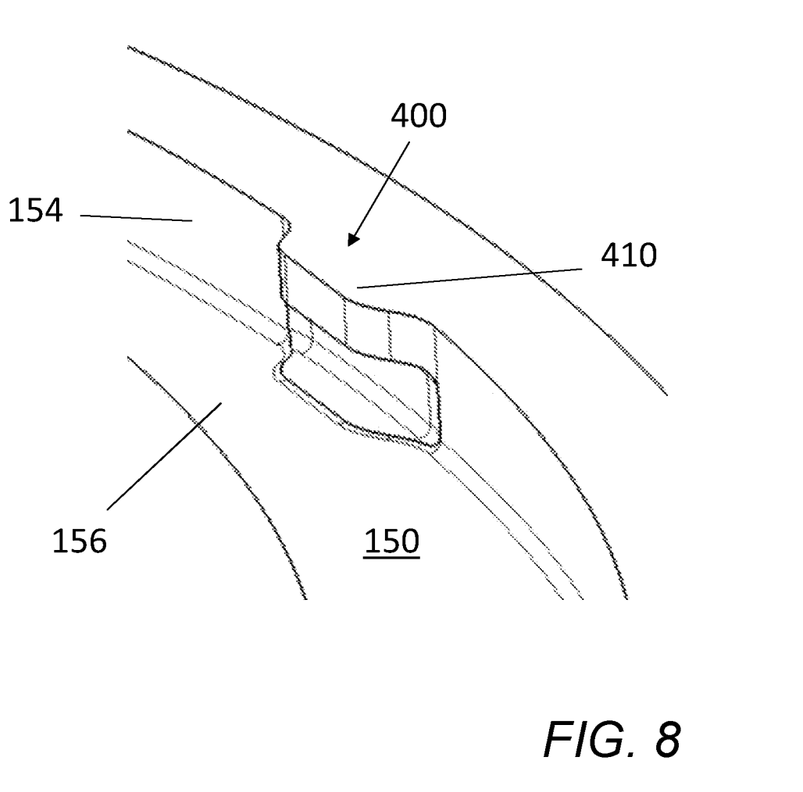
FIG. 8 shows a detailed view of the overhanging lip portion of the recess according to one example.

As shown in FIGS. 7 and 8, the seal retainer 400 comprises an overhanging lip portion 410. The overhanging lip portion 410 extends inwardly, i.e. towards the centre of the channel recess. The overhanging lip portion 410 is shown to extend from a top portion of the second side wall 154 of the recess 150, however, another similar overhanging lip portion 410 may extend inwardly from the first side wall 152. The overhanging lip 410 has an underside surface 405 which is opposite the floor of the recess 156. The overhanging lip portion 410 extends over the first or second concave surface of the seal 220, 240. If the seal 200 is displaced vertically in the recess 150, the underside surface 405 contacts the seal 200 and prevents the seal 200 from being displaced or at least prevents unwanted separation of the seal from the channel recess, e.g. when inverted. In other examples, the underside surface 405 may contact the seal 200 once the seal is installed and located on the floor 156 of the channel recess 150 to prevent movement of the seal 200.

Figure 9:
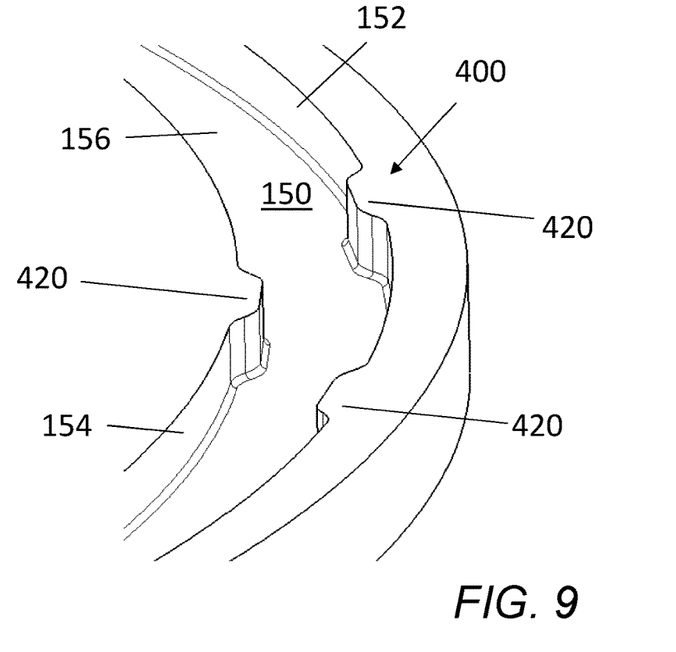
FIGS. 9 and 10 shows the manufacture of the first and second overhanging lip portions in the recess.
Figure 10:
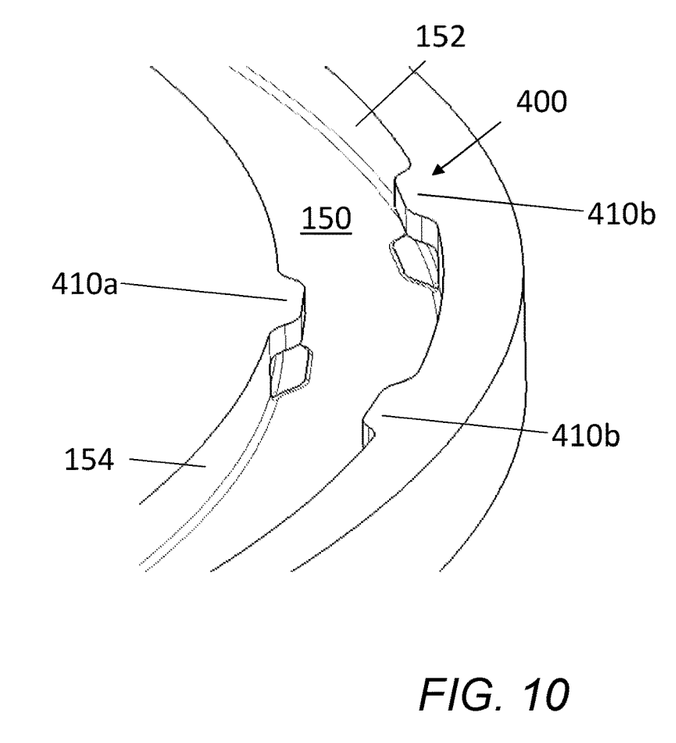

Referring the FIGS. 9 and 10, the seal retainer 400 may have one or more overhanging lip portions 410. In one example, there may be a plurality of first overhanging lip portions 410a extending inwardly from the top first channel recess side wall 154, and a plurality of second overhanging lip portions 410b extending inwardly from the top of the second recess side wall 152. The plurality of first and second overhanging lip portions 410a and 410b may extend over the seal 200 and prevent the seal 200 from being vertically displaced from the channel recess 150, i.e. perpendicularly away from the recess floor. The seal 200 is therefore secured discretely along the entire length of the channel recess 150. The first and second overhanging lip portions 410a, 410b preferably alternate along the recess. That is the say, the first and second overhanging lip portions 410a, 410b are non-aligned along the length of the channel recess 150. This provides not only an optimised retention means for the seal 200, but it also gives adequate space within the channel recess 150 for the seal 200 to be installed in the channel recess 200 via a press-fit, i.e. pressing the first and second concave surfaces of the seal 220, 240 under the respective first and second overhanging lip portions 410a, 410b, along the entire length of the seal 200. The seal 200 may also be installed by squeezing or twisting the seal 200 to insert the seal, or using a lever, such as a screwdriver, to insert the seal 200 under the overhanging lip portions. The seal 200 can be removed in the same manner, i.e. twist and/or squeeze the seal 200 to remove the seal from the overhanging lip portions 410. This arrangement also allows the seal 200 to expand in response to the environment, as the alternating arrangement of the overhanging lip portions 410 still provide space for the first and second voids 172, 174.

The channel recess 150 preferably extends in a continuous loop around the first component 10, and is manufactured by machining a groove into a surface of the first component 10 by any suitable means, such as use of a mechanical cutting tool. The first machining cut or cuts pass partially into the first component 10 from the surface thereof to form a deviating path and creates a plurality of lateral protrusions 420 as shown in FIG. 9 that extend from both the first and second side wall 154, 156. The first machining operation creates the depth and profile of the channel recess 150. The protrusions 420 are then turned into overhanging lip portions 410 in the second machining process by cutting the excess material of the protrusion 420 to form the overhanging lip portions 410. The overhanging lip portions 410 may be formed by any suitable tool, such as a Woodruff Cutter or rotary cutters. The seal retainer 400 is preferably made by machining a billet material to form both the channel recess and the seal retainer of the cover. The continuity of material between the side recess walls 154, 156 and the overhanging lip portions increases the strength of the sealing assembly 300, is quicker to manufacture and avoids undesirable stress concentrations in the first component. Alternatively, the overhanging lip portions 410 may be secured on to the side walls of the channel recess 150 by fastening, co-bonding, adhesive, or any other suitable joining method.

In this example, as shown in FIG. 7, the overhanging lip portions 410 are discrete tabs, i.e. they are individual, tapered and rounded laterally extending protrusions that extend from the first or second side wall 152, 154 of the recess 150. However, the overhanging lip portions 410 may be any suitable protrusion that extends from the first or second side wall, 152, 154, such as a blind fastener and a washer.

Figure 11:
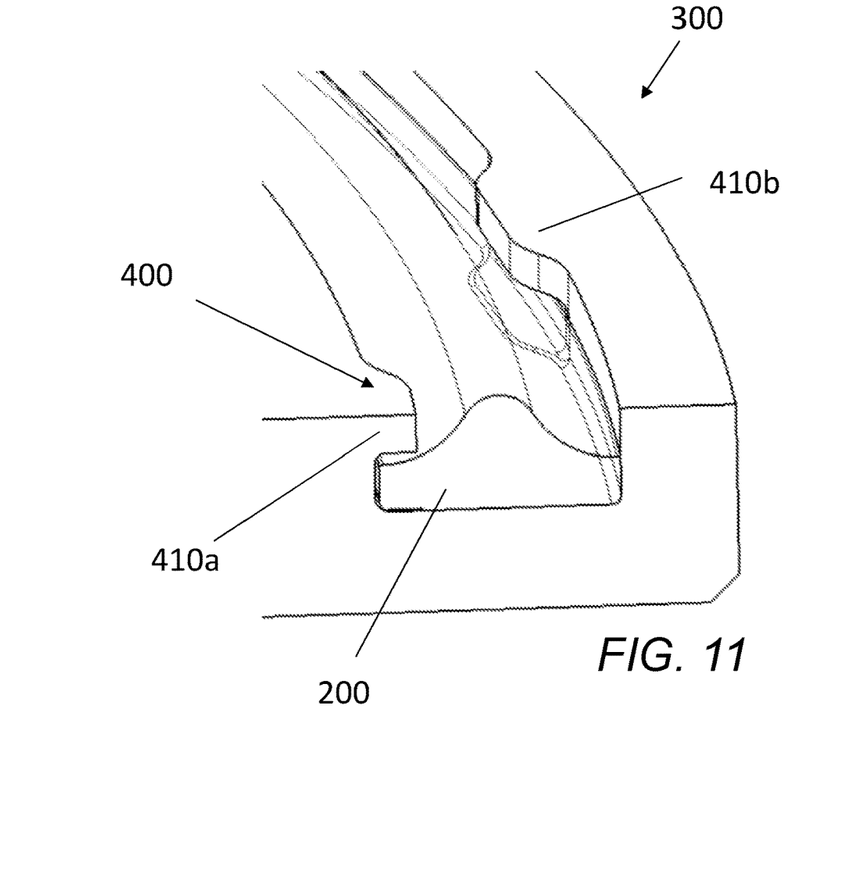
FIG. 11 illustrates a cross-sectional view of the seal installed in a recess with first and second overhanging lip portions.

FIG. 11 shows a cross-section of an example where the seal assembly 300 further comprises the seal retainer 400, with first and second overhanging lip portions 410b and 410a. The seal 200 is fitted within the channel recess and securely retained in the channel recess by the seal retainer 400.

The seal 200 may be replaced in the seal assembly 300 by removing the seal 200 from the channel recess 150, providing a replacement seal 200 and seating the seal on the floor of the recess channel 156.

The seal 200 may be seated in the channel recess 150 by the use of adhesive or by the seal retainer 400, or with a combination of both. Preferably, the seal 200 is seated within the recess without adhesive, as the thickness of the adhesive is difficult to achieve consistently along the entire length of the seal 200, which affects the tolerance of the seal 200. This result in poor quality seal compression in areas with thicker adhesive. Similarly, areas with thinner adhesive provides a possible leak path through the sealing arrangement. Further, the adhesive takes time to cure and is hazardous to the operator, which requires PPE in order to install the seal 200. This adds time to the maintenance of the seal assembly 300. Furthermore, the adhesive chemically infuses with the seal material and the channel recess 150 material, which alters the thickness of the adhesive over time. By mechanically retaining the seal 200 with seal retainer 400, the seal is easily replaced for maintenance and removes any uncertainty on the dimensional tolerances of the seal assembly 300. When no adhesive is used, the channel recess 150 also does not require any additional surface treatment during manufacturing to accommodate contact with an adhesive.

The arrangement described above in relation to FIGS. 3-11 provides a seal 200 whose compression and sealing ability (which includes all geometric properties and internal mechanical properties, and which may have a direct influence on stiffness) can be maximised due to the design of the seal. This provides a seal design with improved longevity as it is less prone to rupture due to over-compression and leaking during flight as the internal stresses of seal are reduced.

Figure 12:
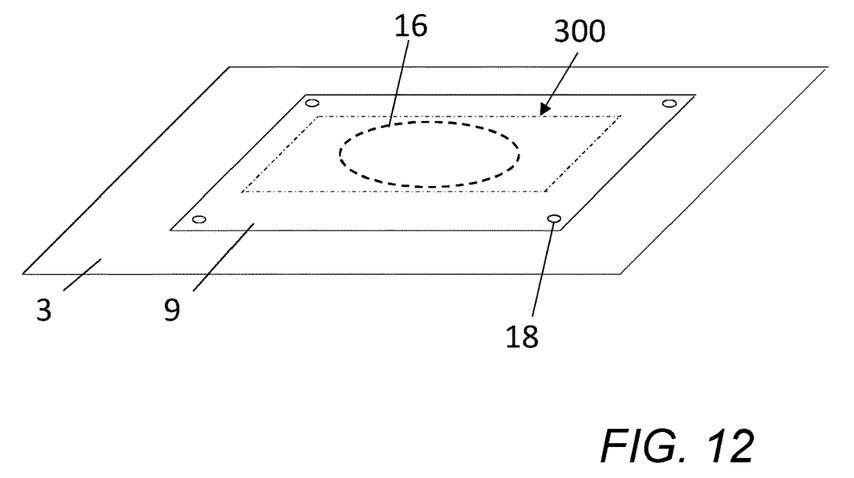
FIG. 12 shows a plan view of a cover with a seal assembly according to one example.

The seal 200 may be implemented in a first and second component 10, 20 that requires sealing when the second surface 120 of the second component 20 contacts the first surface 110 of the first component 10. In one example, shown schematically in FIG. 12, the first component 10 and sealing assembly 300 may be in a fuel access hatch 9, for sealing an aperture 16 providing access into the wing 3. The fuel access hatch 9 is secured to the wing 3 using fasteners 18. The wing 3 is the second component, 20 in this example. The sealing assembly 300 provides a fluid-tight sealing arrangement, which, due prevents over-compression of the seal 200 and minimises the risk of leak path through the hatch 9. The seal assembly 300 is shown to extend around the aperture 16. While the sealing assembly 300 is shown to be generally rectangular in shape, it will be understood that any continuous loop shape may be used for the sealing assembly 300, such as a circular, elliptical or square. The sealing assembly 300 may be in any suitable orientation, shape or size to suit the door or cover that is to be used or where the seal 200 is to be installed.

Similarly, while the sealing assembly 300 is described as being used on a door or cover for a fuel hatch 9, it will be understood that the first component 10 may be any suitable door or cover, preferably a seal removable cover or door, such as a cabin door, landing gear door, or passenger door. The sealing assembly 300 could advantageously be used in other maintenance hatches, such as fuel system ventilation hatches and filter maintenance hatches. The sealing assembly 300 could also be used inside the fuel system. Portions of the fuel tank system, for example, the transfer valves, shut off valves and fuel indicators, have a portion exposed outside of the fuel tank to receive electrical power and/or signalling. The sealing assembly 300 could also be used for sealing cabin windows. The second component 20 may similarly be any suitable aerospace structure, such as a fuel tank, fuselage or belly fairing. The seal 200 and sealing assembly 300 could be similarly applied to other aerospace and non-aerospace applications. The seal 200 and sealing assembly 300 of this invention can be used to seal between virtually any pair of sealing surfaces on an aircraft, such as a door panel or access hatch. The seal and sealing assembly may also provide non aircraft uses, such as automotive, nautical, consumer appliances, etc.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A seal assembly for sealing between a first component opposite a second component. comprising:

a channel recess in the first component, the channel recess having a first recess side wall and a second recess side wall, a floor extending between the first and second reces side walls, and a height defined between the: floor and a surface of the first component in which the channel recess is formed, and a seal comprising a pair of side walls, a base extending between the side walls, a first concave surface extending inwardly from one of the side walls, a second concave surface extending inwardly from the other side wall, and a convex surface extending between the first concave and second concave surface to form a rounded peak having an apex, wherein the first concave surface and the second concave surface meet their respective side walls at an approximately 90 degree angle, wherein one of the seal side walls contacts the first recess side wall and the other side wall contacts the second recess side wall, wherein the pair of seal side walls are parallel to each other and extend perpendicularly from the base of the seal, and the seal has a single rounded peak above the top of the side walls, wherein the seal has a seal width defined between the seal side walls, and a seal height defined between the apex of the rounded peak and the base, wherein the seal width is at least twice the seal height, and wherein the seal is seated on the floor of the channel recess such that the apex of the rounded peak projects no more than 25% of the seal height from the surface of the first component in which the channel recess is formed so as to define the maximum compressibility of the seal height when the second component is brought into contact with the surface of the first component.

2. The seal assembly of claim 1, wherein the apex of the rounded peak is centrally located between the seal side walls, and the seal has a plane of symmetry which bisects the rounded peak through the apex.

3. The seal assembly according to claim 1, wherein the maximum compressibility of the seal height is between 9.5% and 15%.

4. The seal assembly according to claim 1, wherein there is a first smooth continuous curved transition between the first concave surface and the convex surface, and a second smooth continuous curved transition between the second concave and the convex surface.

5. The seal assembly of claim 1, wherein the seal has a constant cross-section along its length.

6. The seal assembly of claim 1, wherein the seal is made of elastomeric material, preferably, fluorosilicone, acrylonitrile butadiene, polychloroprene, nitrile, EPDM, Butyl or Chlorinated Butyl rubber.

7. The seal assembly of claim 1, wherein the seal is a continuous loop.

8. The seal according to claim 1, wherein the base of the seal is substantially flat and wherein the floor of the recess channel is substantially flat.

9. The seal according to claim 1, wherein the first and second recess side walls meets the recess floor to form a radiused corner.

10. The seal assembly according to claim 1, wherein there is a first void between the first recess side wall and the first concave surface of the seal, and a second void between the second recess side wall and the second concave surface of the seal.

11. The seal assembly according to claim 1, wherein the channel recess further comprises a seal retainer for mechanically retaining the seal in the channel recess.

12. The seal assembly according to claim 11, wherein the seal retainer comprises one or more overhanging lip portions extending inwardly from a top of the first and/or second recess sidewalls.

13. The seal assembly according to claim 12, wherein the seal retainer has a plurality of first overhanging lip portions extending inwardly from the top of the first recess side wall, and a plurality of second overhanging lip portions extending inwardly from the top of the second recess side wall.

14. The seal assembly according to claim 13, wherein each of the first overhanging lip portions and each of the second overhanging lip portions are provided in an alternating arrangement along the recess.

15. The seal assembly according to claim 1, wherein the seal is seated within the recess without adhesive.

16. A seal assembly according to claim 1, wherein the first component has a first surface, the second component has a second surface, and the maximum compressibility of the seal height is when the second surface of the second component is brought into contact with the first surface of the first component.

17. An aircraft assembly comprising a cover or door for sealing an aperture, comprising:

the seal assembly of claim 1, wherein the cover or door is the first component of the seal assembly, and the aperture is formed in the second component of the seal assembly.

* * * * *